United States Patent [19]

Rupprecht et al.

[11] Patent Number: 4,836,314

[45] Date of Patent: Jun. 6, 1989

[54] NOVEL GLASS ELEMENTS FOR USE IN BALANCES

[75] Inventors: Georg Rupprecht; Harvey Patashnick, both of Voorheesville, N.Y.

[73] Assignee: Rupprecht & Patashnick Co., Inc., New York, N.Y.

[21] Appl. No.: 216,812

[22] Filed: Jul. 8, 1988

[51] Int. Cl.$^4$ ............................ G01G 3/14; G01L 1/22
[52] U.S. Cl. ................................ 177/210 FP; 177/211; 73/862.64
[58] Field of Search ............................ 177/210 FP, 211

[56] References Cited

U.S. PATENT DOCUMENTS 2,392,314  1/1946  Dalton .
3,926,271 12/1975  Patashnick ................. 177/210 FP
3,950,987  4/1976  Slezinger et al. .............. 73/862.64

OTHER PUBLICATIONS

U.S. Postnikov et al., *Izv. Akad. Naukd. SSSR, Neorg. Matr.*, 7 (3), pp. 485-489, (1971), "Temperature Dependence of the Shear Modulus and Attenuation of Ultrasound in Silicate Glasses".

Primary Examiner—George H. Miller, Jr.
Attorney, Agent, or Firm—Heslin & Rothenberg

[57] ABSTRACT

Improved shaped glass elements having very low thermal coefficients of elastic modulus are provided for use as measuring means in balances for determining the mass of objects with a high degree of resolution. A particularly preferred form of the invention id fabricated from a glass consisting of 60.6% $SiO_2$, 14.7% $B_2O_3$, 8.94% $Al_2O_3$, 4.72% $Na_2O$ and 10.98% BaO, by weight.

8 Claims, 1 Drawing Sheet

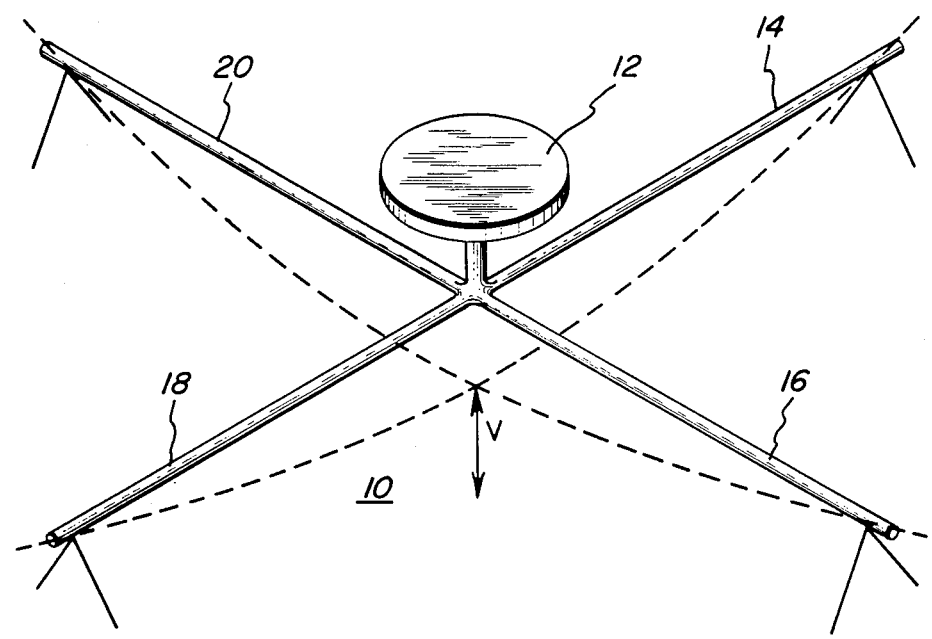

NOVEL GLASS ELEMENTS FOR USE IN BALANCES

This application is related to an application in the names of William H. Dumbaugh and Henry E. Hagy entitled "Glasses Exhibiting Low Thermal Coefficients of Elasticity" filed concurrently with this application.

BACKGROUND OF THE INVENTION

This invention pertains to improved balances which utilize an elastic property of glass to determine mass. More particularly, it pertains to balances for which the resolution shows a low or minimal sensitivity to changes of temperature.

There are a number of approaches for the accurate measurement of mass. Each approach in one way or another relates the mass (m) through a force (F) by means of acceleration (a), i.e.

$$F = ma.$$

In most laboratory balances, acceleration is provided by gravity. Inertial balances, on the other hand, provide the acceleration by mechanical (usually oscillating) motion. For gravity-dependent balances, masses are measured by counterweights or through deformation leading to a restoring force in a supporting member. These restoring forces are produced by elastic deformation or torsional moments in supporting members. These quantities result from the stiffness of the members which are characterized by their elastic or Young's modulus. For an accurate measurement, therefore, it is important that Young's modulus remain essentially constant, and for measurement of very small masses or for extremely accurate measurement of mass the constancy of Young's modulus is critical. In virtually all materials, however, the value of Young's modulus changes with temperature. In the determination of very small masses, or for high resolution, unless the temperature is carefully controlled this effect can result in significant errors. Constant temperature can be achieved and maintained only within certain limits even with considerable effort and expense, and the equipment required also contributes to operational inconvenience. In some applications adequate temperature control is nearly impossible, which results in a severe degradation or loss of resolution. These problems can be significantly reduced by the use of material which has low or minimal temperature dependence of Young's modulus over the nominal temperature operating range of the system.

Balances are conveniently divided into the two types mentioned above; gravitational and inertial, almost all of which may be designed to use the elastic properties of glass as the measuring means. In the case of counterweight type balances, the consideration of variability of Young's modulus does not apply; however for other gravitational or inertial balances, the constancy of Young's modulus becomes a significant or even critical factor when determining masses with high resolution. In a system which utilizes the bending or vibration of a member to determine mass, the restoring force, which together with mass determines frequency, is proportional to Young's modulus. A change in Young's modulus results in a change in the amount of displacement or frequency which can be misinterpreted as a change in mass. Consequently, the use of a material with minimal temperature dependence of Young's modulus becomes critical.

Three of the four types of gravitational balances are sensitive to Young's modulus temperature effects. All six types of inertial balances are sensitive to temperature changes in Young's modulus; however one, the piezoelectric quartz crystal balance, by its nature cannot utilize glass as the measuring element.

Gravitational systems include:

1. Balance beam—This is the most familiar design of analytical balances. A mass to be measured is counterbalanced by known masses along a beam. As mentioned above, Young's modulus does not enter into the measurement because the balance beam is pivoted and is designed for minimal bending.

2. Cantilever beam—An unknown mass is determined by the deflection produced by the mass on the end of a cantilevered beam. Glass fibers, rods, and the like may be used as beams in such balances.

3. Torsion balance—An unknown mass is determined by the amount of torsion produced on a rod (or fiber) on which a torque arm is mounted to hold the mass to be measured. Such rods and fibers are often constructed of glass.

4. Spring balance—The deflection (extension) of a spring is used to measure mass. Glass may be used in making springs for such balances.

Systems 2 through 4 are sensitive to temperature variation, since they all involve deflection of a member which has a temperature sensitive Young's modulus. The degree of deflection depends on the stiffness of the member material which is partially dependent on geometric considerations but is also dependent on the Young's modulus of the material.

Inertial systems include:

1. Oscillating fiber microbalance—described by H. Patashnick and C. L. Hemenway, Review of Scientific Instruments, Vol. 40, No. 8, pp. 1008–1011, August 1969. Mass determination is dependent upon the frequency change of a fiber clamped at one end which is caused to oscillate with and without a mass load on its free end. Fibers (or rods) for such balances are often made of glass.

2. Tapered element oscillating microbalance described in U.S. Pat. No. 3,926,271 which is incorporated herein by reference. This balance works on the same operating principle as (1) but using a tapered rod or hollow tube instead of a fiber. Glass is a material of choice for making the tapered rods or hollow tubes for these devices.

3. Linear motion inertial balance—described in copending U.S. Patent Application, Ser. No. 147,252, filed Jan. 22 1988, which is incorporated herein by reference. A mass is forced to undergo a linear motion in oscillation. Glass members are a material of choice for making the oscillating devices of this invention.

4. Spring balance—Mass is determined by the measurement of frequency change of an oscillating coil spring. Glass may be used for making such springs.

5. Oscillating band balance—a band or string clamped on both ends is set into oscillation. A mass added to the oscillating member causes a frequency shift. The band used in these devices may be made from glass.

6. Quartz crystal microbalance—A quartz crystal is oscillated via the piezoelectric effect. A mass deposited on the crystal surface changes the resonant frequency. Since the operation depends on the piezoelectric properties of quartz, the quartz itself is a critical material for operation of this system, and the use of glass therfore is not applicable for this system.

These six examples are typical of inertial balance types. Other configurations may exist; however, all require an oscillating member or members whose restoring force is essential for oscillation and the change in frequency of oscillation with load is used to determine the mass of the load. The stability of this restoring force with temperature variation is directly related to the stability of the Young's modulus of the member or members with temperature, and the stability of the restoring force in turn affects the resolution of the balance.

The effect of Young's modulus changes due to temperature on mass resolution when using an inertial balance as described in U.S. Pat. No. 3,926,271 serves as an example of the significance of this factor in the determination of mass.

The relationship between the uncertainty of mass with temperature, dm/dT, resulting from Young's modulus change with temperature, dE/dT, is:

$$\frac{1}{E} \frac{dE}{dT} = \frac{1}{m} \frac{dm}{dT}$$

where m is the total effective oscillating mass of the balance. As a result, $$\frac{\Delta m}{\Delta T} = m \left( \frac{1}{E} \frac{dT}{dT} \right)$$

$$\frac{1}{E} \frac{dE}{dT}$$

at room temperature for a commercial glass having the composition 63.1% $SiO_2$, 19.0% $B_2O_3$, 7.5% $Al_2O_3$, 0.65% $Li_2O$, 2.15% $Na_2O$, 3.20% $K_2O$, 2.70% $BaO$ and 0.6% F and a relatively low temperature coefficient of elasticity is $5 \times 10^{-5}$ [°C.]$^{-1}$ at room temperature. For a measuring element of this composition weighing 0.2g (200 milligrams)

$$\frac{\Delta m}{\Delta T} = 0.2 \times 5 \times 10^{-5} = 10^{-5} \text{ g/°C.}$$

As is well known, glasses share the characteristic of exhibiting an elastic modulus which varies depending upon temperature with most other solid materials. It is also known that the extent of this dependence can vary substantially depending upon the composition of the glass and the temperature regime over which the elastic modulus of the glass is measured. Thus V. S. Postnikov et al., in "Temperature Dependence of the Shear Modulus and Attenuation of Ultrasound in Silicate Glasses," *Izv. Akad. Naukd. SSSR, Neorg. Matr.*. 7 (3) pages 485–489 (1971) report a large positive thermal coefficient of shear modulus with temperature for fused quartz, and also describe glasses in the $SiO_2$-$K_2O$-$ZnO$-$BaO$-$PbO$ composition system which exhibit relatively low thermal coefficients of shear modulus over the temperature range $-160°$ to $+160°$ C.

Glasses exhibiting a low thermal coefficient of elastic modulus are useful for applications wherein the detection and measurement of a deflection in a glass element is used to provide an indication of a mass or applied stress. As discussed above, most types of balances may be made employing glass elements as mass detection means.

While some of the glasses disclosed by Postnikov et al. exhibit relatively temperature-independent elastic modulus behavior, these glasses are generally quite unstable and therefore very difficult to melt and fabricate into shapes such as those required for balance elements without devitrification. To our knowledge these glasses have not been used as balance elements nor in any other applications.

Commercial glasses which inherently exhibit relatively low thermal coefficients of elasticity are also known. U.S. Pat. No. 2,392,314, for example, describes glasses consisting essentially of 60–75% $SiO_2$ 10–20% $B_2O_3$, 10–15% $BaO$ and/or $CaF_2$, and 5–10% $Al_2O_3$, and also comprising an alkali metal oxide component including up to about 5% $K_2O$, up to about 2% $Li_2O$, and up to 3% $Na_2O$.

Glasses of this type were originally developed for sealing to cobalt-nickel alloys. A related glass, having the composition $SiO_2$ 63.1%, $B_2O_3$ 19.0%, $Al_2O_3$ 7.5%, $Li_2O$ 0.65%, $Na_2O$ 2.15%, $K_2O$ 3.20%, $BaO$ 2.70%, F 0.6%, which is sold commercially for sealing to cobalt-nickel alloys, exhibits a relatively low thermal coefficient of elastic modulus at ambient temperatures. Further, in contrast to the glasses of Postikov et al., this glass is readily formed by standard glass-working methods into shapes such as rods, fibers, hollow fibers, springs and the like required for balance elements.

Unfortunately, however, balance elements made from these commercial compositions do not exhibit sufficiently low thermal coefficients of elastic modulus. Hence having elements thermal coefficients on the order of 20% or less of that the known elements would be preferred for this application.

Desirable characteristics of elements to be used for technical applications such as described above further include ease of fabrication, good dimensional stability, a low coefficient of thermal expansion, and good chemical durability.

It is therefore a principal object of the present invention to provide shaped glass elements of novel composition for balances which exhibit very low thermal coefficients of elastic modulus in combination with the ease of fabrication, high dimensional stability, a low thermal expansion coefficient and good chemical durability.

Other objects and advantages of the invention will become apparent from the following description thereof.

SUMMARY OF THE INVENTION

The present invention provides shaped glass elements for use as mass detection means in gravimetric and inertial balances which exhibit thermal coefficients of elastic modulus well below those of glass elements of commercial balances, and which in addition offer good stability, low thermal expansion, and good chemical durability. Glass elements satisfying these characteristics are generally of two distinct types. The first type, preferred from the standpoint of glass stability and ease of fabrication, includes elements made from glasses consisting essentially, in weight percent on the oxide basis, of about 60–64% $SiO_2$, 14–18% $B_2O_3$, 8.5–10% $Al_2O_3$, 4–7% $Na_2O$, and 2–12% $BaO$.

A second group of glass elements which also exhibit low thermal coefficients of elastic modulus but are more difficult to fabricate than the preferred elements, comprises those made from alkali silicate glasses containing ZnO, BaO, and PbO as principal modifying constituents. These glasses consist essentially, in weight percent on the oxide basis, of about 51–55% $SiO_2$, 10–13% $K_2O$, 5–15% ZnO, 5–15% BaO, and 10–20% PbO. While exhibiting somewhat higher thermal expansion coefficients and being less preferred from the standpoint of ease of manufacture these elements still combine adequate ease of manufacture with a low thermal coefficient of elasticity and reasonable chemical durability.

DETAILED DESCRIPTION

A variety of techniques for measuring the thermal coefficient of elastic modulus of glass are known. For example, as disclosed by Postnikov et al., the velocity of an ultrasound wave in a glass sample depends on the shear modulus of the glass, and can be measured at various temperatures to evaluate the thermal coefficient of shear modulus or elastic modulus for that glass.

Shaped glass elements having a low temperature coefficient of elastic modulus are useful in the manufacture of balances capable of measuring very small masses and/or larger masses with high resolution. These balances typically comprise an oscillating or bending system consisting of elastic glass members, whereby the resonance frequency of an oscillating system or the amount of displacement in a bending system depends upon the mass deposited on a shaped glass substrate surface.

Of course, as the elastic modulus of the elastic members of the system changes with temperature, the resonance frequency or amount of displacement changes, even though the mass on the substrate is unchanged. Therefore, an error in the mass determination is introduced.

Practical requirements for shaped glass elements for these applications have been identified. If possible, the elements should exhibit a normalized temperature coefficient of elastic modulus averaging less than about 10 ppm/°C. over a projected use temperature range perhaps as large as −50° C. to +150° C. Thus coefficients of less than 20% and preferably less than 10% of that of elements of the prior art are needed. A glass which has been used for this purpose contains about 63% $SiO_2$, 19% $B_2O_3$, 7.5% $Al_2O_3$, 0.65% $Li_2O$ 2.15% $Na_2O$, 3.2% $K_2O$, 2.7% BaO and 0.6% F, has a thermal coefficient of elastic modulus of about 60 ppm/°C. at 50° C. and an average coefficient of thermal expansion (0°–300° C.) of about $46 \times 10^{-7}$/°C.

The shaped glass elements also must exhibit excellent dimensional stability, and will preferably demonstrate a relatively low coefficient of thermal expansion so as to provide stable physical dimensions in use. Finally the elements should exhibit reasonable chemical durability, particularly for applications requiring exposure of the element to corrosive environments.

Examples of glasses which have been found to meet these requirements are reported in Table I below. Melts of the glasses reported in Table I may be conveniently compounded in 1000 gram batches, with the batches then being tumble mixed to assure melt homogeneity. The batches may then be melted in platinum crucibles in an electric furnace, with melting being carried out over a 4-hour interval at 1550° C. The melts are then stirred for 15 minutes and allowed to soak at 1550° for an additional one and one-half hours before casting into slabs. The glasses are finally annealed at 500° C.

TABLE I

|  | 1 | 2 | 3 | 4 | 5 |
|---|---|---|---|---|---|
| $SiO_2$ | 63.4 | 63.5 | 60.6 | 63.3 | 60.3 |
| $B_2O_3$ | 16.7 | 15.4 | 14.7 | 17.3 | 16.5 |
| $Al_2O_3$ | 9.35 | 9.36 | 8.94 | 9.69 | 9.24 |
| $Li_2O$ | — | — | — | — | — |
| $Na_2O$ | 4.93 | 6.13 | 4.72 | 6.95 | 5.46 |
| $K_2O$ | — | — | — | — | — |
| BaO | 5.61 | 5.62 | 10.98 | 2.77 | 8.44 |

These glasses consist essentially, in weight percent on the oxide basis, of about 60–64% $SiO_2$, 14–18% $B_2O_3$, 8.5–10% $Al_2O_3$, 4–7% $Na_2O$ and 2–12% BaO. Samples of the glasses are formed into glass fibers, rods or hollow elements by the standard glass-working technique of heating in a flame and reshaping. They may be further modified for particular applications. For example, a glass rod or fiber may be heated in a flame and then wound around a mandrel to form a spring for use in a spring balance. Several elements may be fused together to form the linear motion device of the aforementioned U.S. Patent Application, Ser. No. 147,252.

Simple glass fibers formed by this glass-working method were tested to determine their normalized thermal coefficient of elastic modulus (in short normalized elastic modulus or NEM). The values given in Table II below were determined at 50° C. These values represent a substantial improvement over the performance of the prior art glass element, which exhibits a normalized elastic modulus of 62 ppm/°C. at 50° C.

TABLE II

| Composition | 1 | 2 | 3 | 4 | 5 |
|---|---|---|---|---|---|
| (NEM), (ppm)/°C. | 8.8 | 1.8 | −4.4 | −3.0 | 6.8 |

Not suprisingly, the composition of the shaped glass element is found to critically affect the elastic and other physical properties thereof. Hence, balance elements made from glasses close in composition to those within the scope of the invention but outside the ranges specified generally will not exhibit the combination of properties needed for applications requiring a low thermal coefficient of elastic modulus.

Table III below reports the results for a number of elements made from related alkali silicate glasses. These elements do not meet the requirement for a low thermal coefficient. The elements reported include one made from the previously preferred commercial glass, as well as compositional variations thereupon which were prepared in an effort to modify thermal properties of the glass elements without destabilizing the glass element or affecting other essential properties. Also included in Table III for each of the elements shown is the normalized elastic modulus of the element as determined at 50° C.

TABLE III

|  | Prior Art Element | 6 | 7 | 8 | 9 |
|---|---|---|---|---|---|
| $SiO_2$ | 63.1 | 64.5 | 67.0 | 65.5 | 64.9 |
| $B_2O_3$ | 19.0 | 19.4 | 17.1 | 19.4 | 17.1 |
| $Al_2O_3$ | 7.5 | 7.66 | 7.55 | 6.64 | 9.58 |
| $Li_2O$ | 0.65 | — | — | — | — |
| $Na_2O$ | 2.15 | 5.72 | 5.64 | 5.71 | 5.66 |
| $K_2O$ | 3.20 | — | — | — | — |
| BaO | 2.70 | 2.77 | 2.73 | 2.76 | 2.74 |
| F | 0.6 | — | — | — | — |
| (NEM), (ppm)/°C. | 62.0 | 37.8 | 33.0 | 42.4 | 17.0 |

Referring more particularly to the compositions in Table III, element 6 represents an improvement over the prior art element with respect to normalized elastic modulus due to the elimination of mixed alkalis therefrom. This modification has the further advantage of improving the dimensional stability of the element in the high temperature regime below the glass strain point. However, the normalized elastic modulus of this all-sodium glass element is clearly still too high to be acceptable.

Lowering the boric oxide level as in element 7 results in a slight further improvement in normalized elastic modulus with some additional benefit being obtained by substituting alumina for silica as seen in 8 and 9. However, continued substitution of this nature is not useful because it rapidly degrades the stability of the element against crystallization and thus both its ease of fabrication and its stability.

In fact, low values for the normalized elastic modulus in combination with other desired properties were ultimately achieved in this system by replacing some of the $Na_2O$ with barium oxide, with a general increase in sodium and/or barium oxide content at the expense of silica and/or boric oxide also being employed. Examples of the resulting glass elements and their properties are shown in Tables I and II above.

The presently preferred glass element in accordance with the invention is 3 in Table I. For a shaped glass measuring element of this composition $$\frac{1}{E} \frac{dE}{dT} = 3 \times 10^{-6} [°C.]^{-1}$$

at room temperature. Once again for a balance having an effective oscillating mass of 200 mg.

$$\frac{\Delta m}{\Delta T} = 0.2 \times 3 \times 10^{-6} = 6 \times 10^{-7} g/°C.$$

As shown above, for a similar element of the prior art $(\Delta m)/(\Delta T)$ is only $10^{-5}$ g./°C. Consequently, the previous mass uncertainty is reduced by more than an order of magnitude when using a glass member of the invention. This element substantially exceeds the requirement for low normalized elastic modulus values and additionally is found to exhibit zero temperature dependence at approximately 34° C. Property data for element 3 are shown in Table IV below:

TABLE IV

| Physical Properties | |
|---|---|
| Softening Point: | 770° C. |
| Annealing Point: | 579° C. |
| Strain Point: | 537° C. |
| Expansion Coefficient: (25-300° C.) | 49.9 × $10^{-7}$/°C. |
| Density: | 2.479 g/cm$^{-3}$ |

As previously noted, a study of V. S. Postnikov et al., *Izv. Akad. Nauk SSSR, Neorg. Mater.*, 7 (3), 485-489 (1971), had identified a group of glass compositions in the $K_2O-PbO-BaO-ZnO-SiO_2$ system exhibiting a low thermal coefficient of shear modulus. Compositions 10 and 11 in Table V below are representative of these glasses, the compositions being reported in weight percent but with molar compositions being reported in parentheses. Although these materials were reported as having a low thermal coefficient of elastic modulus, the data in Table V indicate that these glasses are also difficult or impossible to fabricate. Thus glass 10 in Table V exhibits difficult to unsatisfactory lampworking or fabricating characteristics while glass 11 devitrified during lampworking. Therefore, shaped glass balance elements of the invention could not be prepared from these glasses, and their normalized elastic moduli could not be determined.

TABLE V

| Oxide | 10 | 11 | 12 |
|---|---|---|---|
| $SiO_2$ | 54.1 (70) | 45.4 (65) | 53.6 |
| $K_2O$ | 6.05 (5) | 5.48 (5) | 12.0 |
| ZnO | 15.7 (15) | 14.2 (15) | 10.4 |
| BaO | 9.85 (5) | 8.92 (5) | 9.77 |
| PbO | 14.3 (5) | 26.0 (10) | 14.2 |
| Soft Pt. (°C.) | 803 | — | 761 |
| Ann. Pt. (°C.) | 597 | 551 | 559 |
| Str. Pt. (°C.) | 552 | 509 | 514 |
| C.T.E. × $10^{-7}$/°C. (25-300° C.) | 61.5 | 68.3 | 76.0 |
| Density (g/cm$^3$) | 3.201 | 3.586 | 3.092 |
| Fabrication Chactrsts. | Difficult to unsatis. | Devitrified | Satisfactory |

In contrast to the glasses reported by Postnikov et al., glass 12 in Table V exhibits improved stability manifested by satisfactory fabricating characteristics while still retaining a low thermal coefficient of elastic modulus. Thus shaped glass element 12 exhibits an NEM value of −8.8 ppm/°C. and elements made from glasses close to that composition will exhibit similarly low values for this parameter.

The combination of characteristics shown by element 12 and closely related elements is attributed to somewhat reduced ZnO levels in combination with increased amounts of $K_2O$ as compared with the Postnikov et al. glasses. Thus, for glasses of this general type, compositions basis, of about 51-55% $SiO_2$, 10-13% $K_2O$, 5-15% ZnO, 5-15% BaO and 10-20% PbO, are presently considered suitable for the manufacture of workable glasses exhibiting low temperature coefficients of elastic modulus. Compositions which are higher in ZnO and/or BaO or lower in $SiO_2$ and/or $K_2O$ have demonstrated poor fabrication characteristics as well as, in many cases, a larger temperature dependence of elastic modulus on temperature than the preferred compositions.

Of course, the foregoing is merely illustrative of articles and methods which may be practiced within the scope of the appended claims.

What is claimed is:

1. An improved glass element useful in determining the mass of objects by means of measuring an elastic property of said element selected from the group consisting of:
   its frequency of vibration,
   its amount of bending or deflection, and
   its amount of extension, first in the absence of the mass to be determined and second with said mass resting at some point on said element, determining the difference in said property and calculating the mass from said difference in said elastic property wherein said element is comprised of a glass which exhibits an average thermal coefficient of elastic modulus over the temperature range −50° to +150° C. which does not exceed about 10 ppm/°C.

2. A glass element in accordance with claim 1 which is comprised of a glass chosen from the group consisting of a glass consisting essentially, in weight percent on the oxide basis, of about 60–64% $SiO_2$, 14–18% $B_2O_3$, 8.5–10%, $Al_2O_3$, 4–7% $Na_2O$, and 2–12% BaO and a glass consisting essentially, in weight percent on the oxide basis, of about 51–55% $SiO_2$, 10–13% $K_2O$, 5–15% ZnO, 5–15% BaO, and 10–20% PbO.

3. A glass element in accordance with claim 1 which is a solid rod.

4. A glass element in accordance with claim 1 which is a tapered solid rod

5. A glass element in accordance with claim 1 which is a hollow tube

6. A glass element in accordance with claim 1 which is a tapered hollow tube

7. A glass element in accordance with claim 1 which is a coil spring

8. A glass element in accordance with claim 1 which is a suspension system for an inertial balance, said suspension system comprising:
   a supporting framework; and
   means for suspending the weighing platform from the supporting framework such that the platform when oscillated is constrained to undergo uniform linear motion with respect to said framework.

* * * * *

UNITED STATES PATENT AND TRADEMARK OFFICE
CERTIFICATE OF CORRECTION

PATENT NO. : 4,836,314

DATED : June 6, 1989

INVENTOR(S) : Rupprecht et al.

It is certified that error appears in the above-identified patent and that said Letters Patent is hereby corrected as shown below:

On the cover, Assignee: --Albany, N.Y.-- should replace "New York, N.Y.".

In the Abstract: Line 5, --is-- should replace "id".

Column 3, line 30 the equation should read:

$$\frac{\Delta m}{\Delta T} = m \frac{1}{E} \frac{dE}{dT}$$

Column 4, line 50, insert the following:

-- BRIEF DESCRIPTION OF THE DRAWING

The drawing is a schematic illustration of an embodiment of the linear motion inertial balance described in copending U.S. Patent Application, Serial No. 147,252, mentioned above.--

Column 5, between lines 29 and 30, insert the following:

--One such system is depicted in the drawing. A sample table or weighing platform 12 is attached at the intersection of four symmetrically disposed, elongate, elastic support elements 14, 16, 18 and 20 arranged in a cross configuration or arrangement 10. As shown, the outer ends of the support members are, in turn, supported at equal distances from the intersection, in a manner which permits their operation in a bending mode (as indicated by the dashed lines). The four support members lie in a common plane when the weighing platform is at rest. A vibration of the platform is introduced in a direction perpendicular to the plane containing the support members, as indicated by double headed arrow V. As a result of the dynamic restrictions imposed by the symmetric arrangement of support members 14, 16, 18 and 20, the weighing platform 12 is constrained to undergo uniform linear motion.

UNITED STATES PATENT AND TRADEMARK OFFICE
CERTIFICATE OF CORRECTION

PATENT NO. : 4,836,314

DATED : June 6, 1989

INVENTOR(S) : Rupprecht et al.

It is certified that error appears in the above-identified patent and that said Letters Patent is hereby corrected as shown below:

The mass measurement accuracy of a vibratory inertial balance is dependent upon the precision with which linear motion is maintained at the weighing platform undergoing oscillation. The moving mass of the measuring system determines its sensitivity because the lower the oscillating system mass the greater the shift in frequency for a given sample mass.--

Column 9, line 6, delete the "," after 10%.

Signed and Sealed this

Thirteenth Day of March, 1990

Attest:

JEFFREY M. SAMUELS

Attesting Officer

Acting Commissioner of Patents and Trademarks